(12) United States Patent
Lo et al.

(10) Patent No.: US 6,657,729 B2
(45) Date of Patent: Dec. 2, 2003

(54) DITHERING SYSTEM AND METHOD FOR A LASER DIODE LIGHT SOURCE FOR AN OPTICAL GYROSCOPE

(75) Inventors: Pei-Hwa Lo, Ramsey, NJ (US); Herb Califano, Bloomingdale, NJ (US)

(73) Assignee: Honeywell International Inc., Morristown, NJ (US)

( * ) Notice: Subject to any disclaimer, the term of this patent is extended or adjusted under 35 U.S.C. 154(b) by 335 days.

(21) Appl. No.: 09/814,902

(22) Filed: Mar. 22, 2001

(65) Prior Publication Data

US 2003/0189710 A1 Oct. 9, 2003

Related U.S. Application Data

(60) Provisional application No. 60/192,276, filed on Mar. 27, 2000.

(51) Int. Cl.⁷ .................................................. G01C 19/72

(52) U.S. Cl. ....................................................... 356/460
(58) Field of Search ............................. 356/460; 372/32

(56) References Cited

U.S. PATENT DOCUMENTS

| 5,136,600 A | 8/1992 | Fidric et al. .................... 372/32 |
| 6,215,809 B1 | 4/2001 | Ziari et al. ...................... 372/96 |

*Primary Examiner*—Samuel A. Turner

(57) ABSTRACT

A system and method are provided for improving spectrum linewidth and stability while using the lasing region of a conventional laser diode light source. The inventive system and method provide a dithering signal for varying the drive current of the laser diode light source. By varying the drive current, the spectrum linewidth and stability of the conventional laser diode light source is significantly improved. Specifically, an optic fiber gyroscope can be driven by a conventional laser diode source which is powered by a dithered drive signal.

2 Claims, 5 Drawing Sheets

DITHERING SYSTEM AND METHOD FOR A LASER DIODE LIGHT SOURCE FOR AN OPTICAL GYROSCOPE

PRIORITY

This application claims priority to U.S. Provisional Application No. 60/192,276, filed Mar. 27, 2000, the contents of which are incorporated herein by reference.

FIELD OF THE INVENTION

This invention relates to a system and method for improving the spectrum line width and stability of a laser diode light source and, more specifically, to fiber optic gyroscopes including laser diodes.

BACKGROUND OF THE INVENTION

Generally, conventional laser diode light sources are economical and readily available commercially. Conventional laser diode light sources are widely used in the telecommunication industry and are effective over a wide temperature range. For example, a conventional laser diode light source is effective over a temperature range of −30 to 75 degrees Celsius. However, conventional laser diode light sources are generally not applicable to fiber optic gyroscope applications due to their narrow spectrum linewidth and unstable light spectrum characteristics. These attributes cause sub-interferometer effects in the fiber optic gyroscope which result in a poor in-run bias stability and scale factor stability.

In the past it has been proposed to use special broadband lasers as light sources for fiber optical gyroscopes. Such lasers however are very expensive and, indeed, cost several magnitudes more than the types of laser diodes presently available for communications purposes. However, as noted above, while these diodes are available and are inexpensive, they have the characteristic of sharp or narrow bandwidths and thus have not proven usable for applications which require a wide bandwidth, such as fiber optical gyroscopes.

One proposal to mitigate the sub-interferometer effects is to use only the non-lasing operational region of the conventional laser diode as an operational light source for operating the fiber optic gyroscope. A drawback of this proposal is that the power level of the non-lasing operational region of the conventional laser diode is very low. Therefore, the angle random walk characteristic of the fiber optic gyroscope tends to be undesirable. Other conventional light sources, such as super luminescence diode (SLD) and pump light sources, require active temperature controls and are very expensive to operate.

Accordingly, there is a need for a system and method which use the lasing region of the conventional laser diode light source but which stabilize the spectrum linewidth of the light source. More specifically, there is a need for a fiber optical gyroscope which can be operated with laser light from a conventional laser diode.

SUMMARY OF THE INVENTION

The invention provides a system and method for improving spectrum linewidth and stability while using the lasing region of a conventional laser diode light source. The inventive system and method provide a specially varying signal for varying the drive current of the laser diode light source. By varying the drive current, we have discovered that the spectrum linewidth and stability of the conventional laser diode light source are significantly improved.

We refer to this specially varying signal as a dithering signal by analogy to the technique used in telecommunication, such as television broadcasting, representing the entire gray scale of a picture by picture elements with only one of two levels ("white" and "black") in which a multilevel input image signal is compared with a position dependent set of thresholds, and picture elements are set to "white" only where the image input signal exceeds the threshold.

In one embodiment of the invention, an analog dithering system is provided for generating an analog dithering signal. In another embodiment of the invention, a digital dithering system is provided for generating a digital dithering signal. The analog and digital dithering signals can be used in a plurality of applications where a variation of a light source's drive current is warranted, such as in a fiber optic gyroscope.

We have found that when the dithering signal is provided to vary the laser diode drive current of a light source used to operate a fiber optic gyroscope, there is a significant improvement in the in-run bias stability and scale factor stability of the gyroscope. Further, the inventive system and method realize an ultra low cost light source that can operate in a wide temperature range, e.g., −30 to 75 degrees Celsius, and requires very low power consumption.

DETAILED DESCRIPTION OF THE PREFERRED EMBODIMENTS

Figure 1:
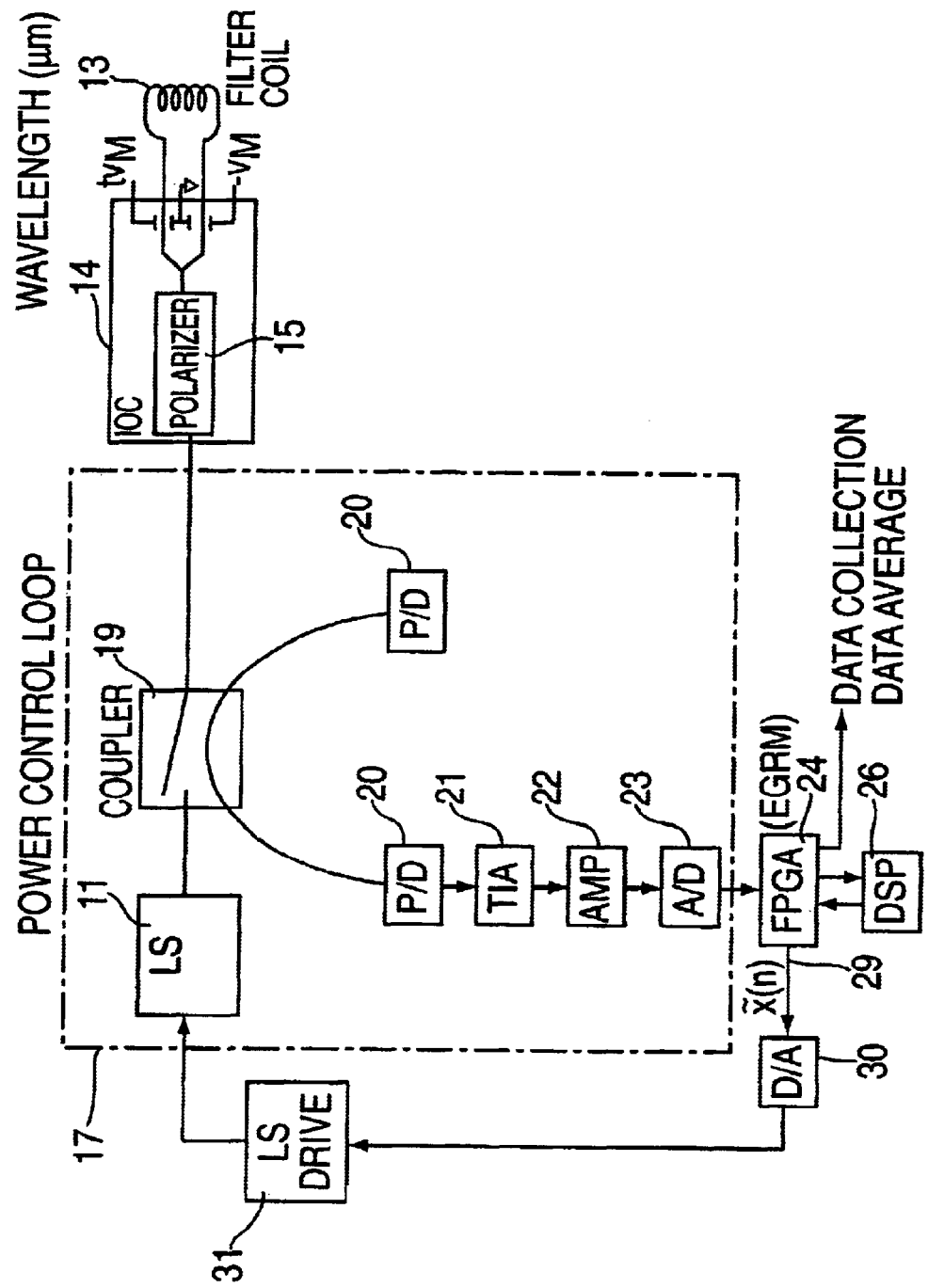
FIG. 1 is a schematic diagram of one illustrative embodiment of our invention.

Turning now to FIG. 1, there is depicted one specific illustrative embodiment of our invention, comprising a fiber optic gyro 10 that can be driven by a light source 11 which is a conventional and inexpensive laser diode. As is known the gyro 10 includes a fiber coil 13 and an integrated optics chip 14 which includes a polarizer 15. The light source 11 is incorporated in the power control loop 17 which also includes the coupler 19 connected to the light source 11 for transmitting the laser beam to the gyro 10 and also connected to photodiodes 20 which receive the returned light beam from the gyro 10. A photodiode 20 is connected through a transimpedance amplifier 21, a variable amplifier/filter 22, and an analog to digital converter to a field programmable gate array 24.

In accordance with our invention the field programmable gate array 24 creates a dither pattern generated by and under control of a digital signal processor 26. The dither signal appears on the output 29 of the array 24 and, after passing through a digital to analog converter 30, is applied through the light source drive circuit 31 to the light source 11.

For a desired power level, P, the control signal X(n) that appears on lead 29 is given by the following equation $$\tilde{X}(n) = \alpha X(n-1) + \beta [X(n) - P]$$

where $\alpha$ and $\beta$ are constants, X(n−1) is the measured power level at cycle n−1, and X(n)−P is the power level error at cycle n. Accordingly, and in accordance with our invention, the array 24 adds the dither and control signal to modulate the light source, as shown in FIG. 1, through the gain control loop including the converter 30 and the driver 31. Further, in accordance with our invention, the control loop maintains the light source under various operating conditions that enable the fiber optics gyroscope to use the lasing region of the laser diode and stabilize the modulated light spectrum bandwidth. The result is that a gyroscope with the drive circuitry depicted in the embodiment of FIG. 1 of our invention has a much improved in run bias stability and angle random walk. Further, with our invention, there is attained the realization of an ultra low cost light source that can operate in wide temperature ranges and requires very low power consumption.

Figure 2:
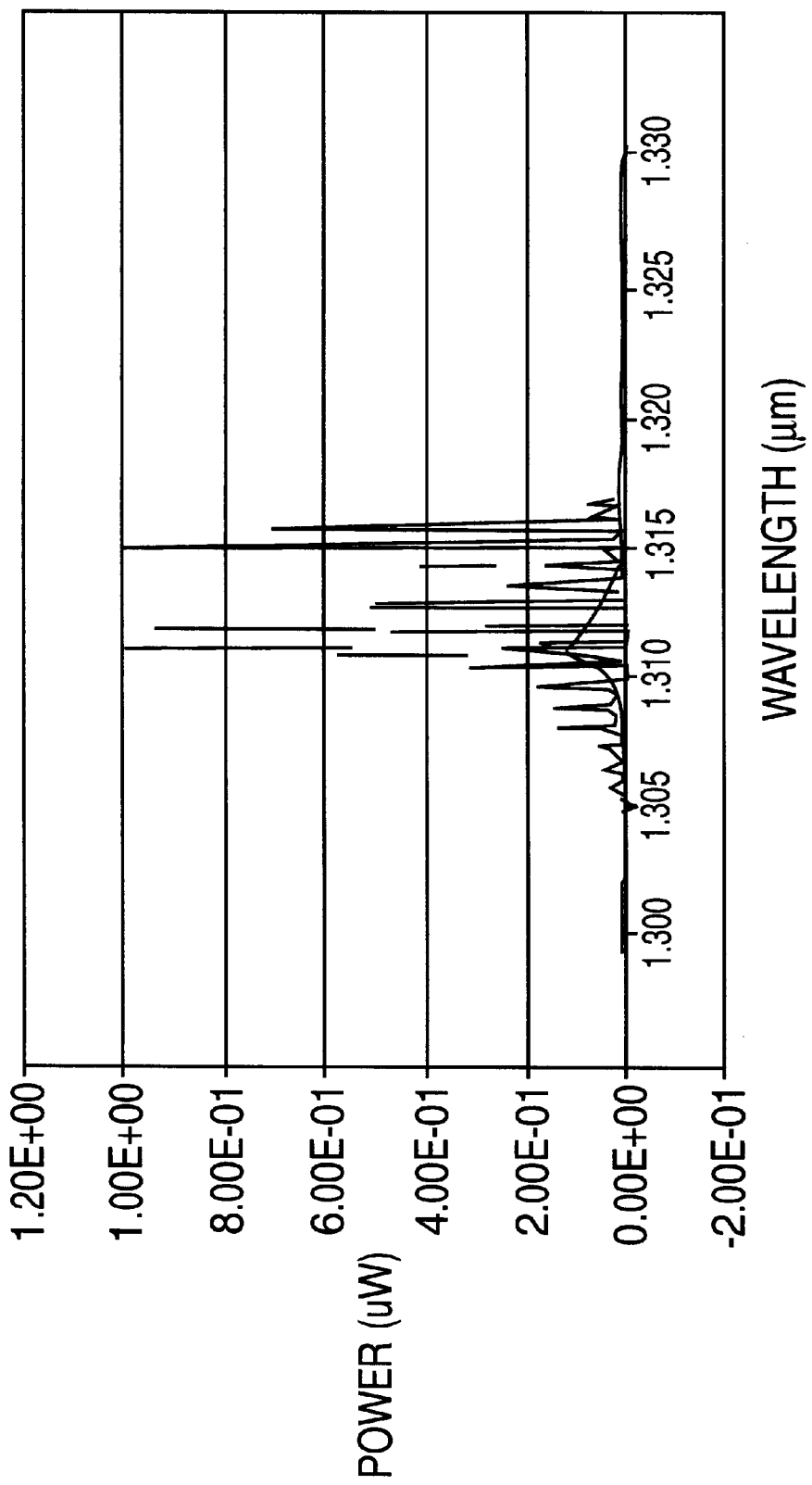
FIG. 2 is a chart illustrating a typical spectrum of conventional laser diode light source.

To understand the significant difference in the output of the conventional laser diode in accordance with out invention, as depicted in the embodiment of FIG. 1, and without our invention, reference should first be made to FIG. 2 which depicts a typical spectrum generated by such a conventional diode light source, but without the dither signal drive of our invention.

The amount of photons emitted from a conventional laser diode light source depends on the drive current injected into the laser diode light source. Beyond the lasing threshold, light power emitted by the laser diode light source is almost linearly proportional to the supplied drive current until the light power reaches saturation.

FIG. 2, plots the spectrum as a function of power (uW) and wavelength (um) for a conventional laser diode with a standard drive current applied. It is noted that the spectrum is obtained by four snap shots using a spectrum analyzer. The spectrum variation from one snap shot to the next can be easily observed. The amount of protons emitted from a laser diode depends on the device current injected into the laser diode. Beyond the lasing threshold, light power emitted by the laser diode is almost linearly proportional to the supplied current until it reaches saturation. A typical spectrum generated by such a laser diode is depicted in FIG. 2.

A mathematical measurement of the standard deviation of the wavelength centroid ($[\Sigma Power(I) * \lambda(I)]/P$) of the spectrum shown by FIG. 2 is indicated by Table I. The parameter Power(I) is the power level measured at $\lambda(I)$, where $\lambda(I)$ represents the wavelength at the ith spectrum beam. P represents the total power emitted by the laser diode light source. It is noted that the variation and instability of the spectrum as shown by FIG. 2, become significant sources of error if one uses the conventional laser diode light source in fiber optic gyroscope applications.

TABLE I

Mathematical measurements of the spectrum shown by FIG. 2.

| Measurements | Wavelength Centroid (micron ($10^{-6}$)) |
|---|---|
| 1 | 1.308614 |
| 2 | 1.308534 |
| 3 | 1.308222 |
| 4 | 1.308285 |

TABLE I-continued

Mathematical measurements of the spectrum shown by FIG. 2.

| Measurements | Wavelength Centroid (micron ($10^{-6}$)) |
|---|---|
| 5 | 1.308578 |
| 6 | 1.308144 |
| Standard Deviation | $2.02645 \times 10^{-10}$ |
| Average | $1.308396 \times 10^{-6}$ |
| Estimated Wavelength Variation (ppm) | 155 |

The estimated wavelength variation factor is the ratio of the standard deviation to the average. The ratio is expressed in terms of parts per million (ppm) and it is an indication of scale factor stability.

Figure 3:
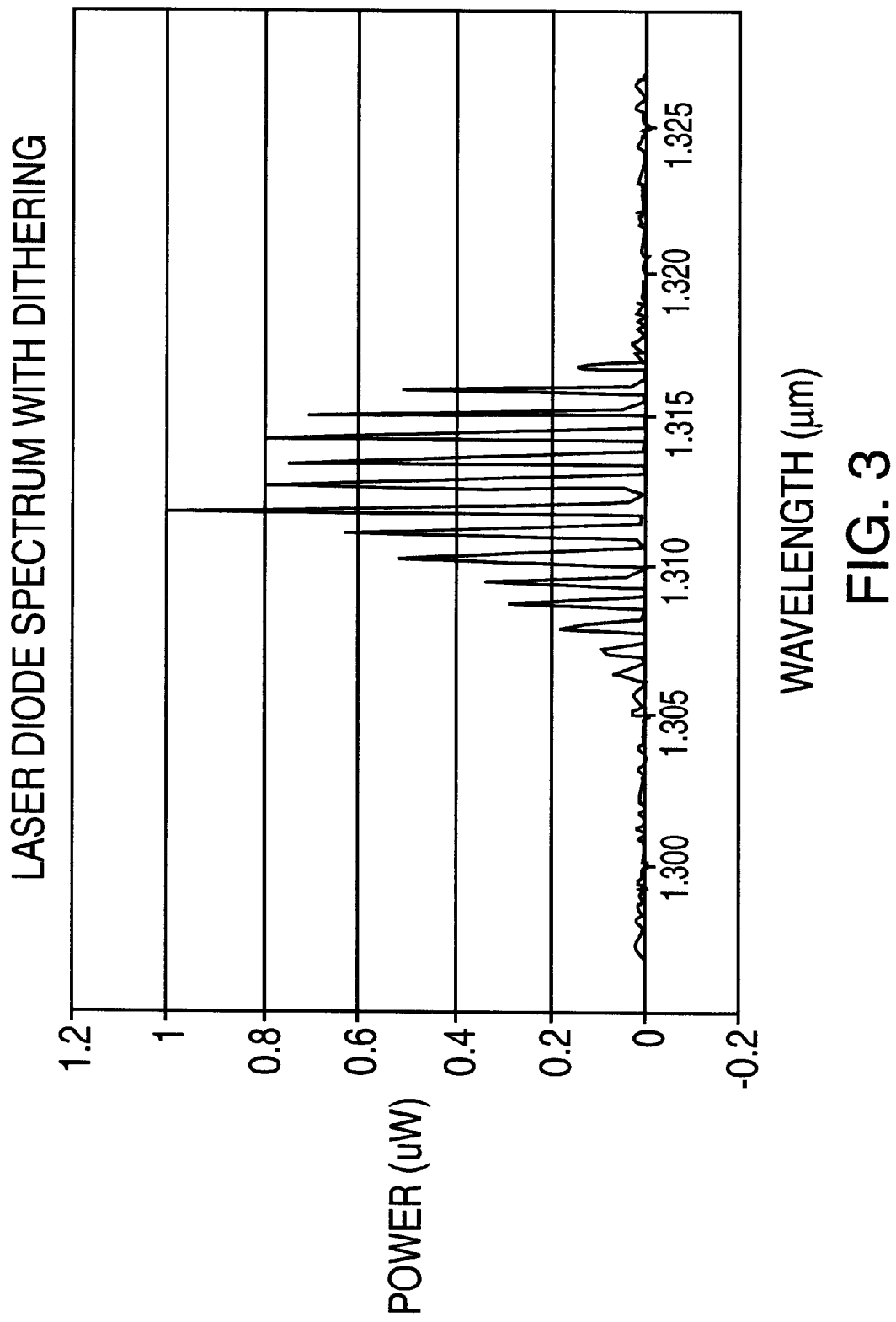
FIG. 3 is chart illustrating a spectrum of conventional laser diode light source where dithering is performed according to the present invention.

By varying the laser diode drive current, as with a dithering signal as depicted in the embodiment of FIG. 1, we have found that the stability of the laser diode spectrum is significantly improved. With reference to FIG. 3, there is a chart illustrating a spectrum of conventional laser diode light source where dithering is performed according to the present invention. Similarly to FIG. 2, the chart of FIG. 3 plots the spectrum as a function of power (uW) and wavelength (um). It is noted that the spectrum of FIG. 3, is obtained by four snap shots using a spectrum analyzer.

It can be easily observed from FIG. 3, that when varying the laser diode drive current, i.e., performing the dithering method of the present invention, the stability of the laser diode spectrum and its linewidth are significantly improved. The supplied varying drive signal is referred to as a dithering signal, in contrast to the instability evident by FIG. 2 when dithering is not performed.

A mathematical measurement of the standard deviation of the wavelength centroid ($[\Sigma Power(I) * \lambda(I)]/P$) of the spectrum shown by FIG. 3 is indicated by Table II.

TABLE II

Mathematical measurements of the spectrum shown by FIG. 3.

| Measurements | Wavelength Centroid (micron ($10^{-6}$)) |
|---|---|
| 1 | 1.30893 |
| 2 | 1.30885 |
| 3 | 1.30891 |
| 4 | 1.30894 |
| 5 | 1.30884 |
| Standard Deviation | $4,67017 \times 10^{-11}$ |
| Average | $1.30889 \times 10^{-6}$ |
| Estimated Wavelength Variation (ppm) | 35.68 |

By comparing Tables I and II, it is observed that the estimated wavelength variation shown in Table II is 23% of that shown in Table I. In other words, the scale factor stability is improved by at least 4.4 times by applying the dithering method of the present invention to the drive current of the laser diode.

The amplitude and frequency of the dithering signal affect the effectiveness of the dithering method with respect to varying light sources. Therefore, a dithering signal having specific characteristics is advantageously provided to optimally stabilize and improve linewidth of a laser diode spectrum of a particular light source.

We have observed that the wave-shape of the dithering signal does not affect the effectiveness of the dithering method of the present invention. Accordingly, the waveshape of the dithering signal can be any shape, including pseudo random noise, white noise, square, sinusoidal, triangular, and combinations thereof.

The dithering method of the present invention can be implemented efficiently using either analog or digital systems to generate the dithering signal. These systems can be used to adjust several characteristics of the generated dithering signal, such as amplitude, frequency, phase and waveform. While one specific technique for generating the dither signals for driving a laser diode is depicted in the specific illustrative embodiment of FIG. 1, other dither signal drive systems, either analog or digital, can be employed, as discussed below with reference to the embodiments depicted in FIGS. 4 and 5.

Figure 4:
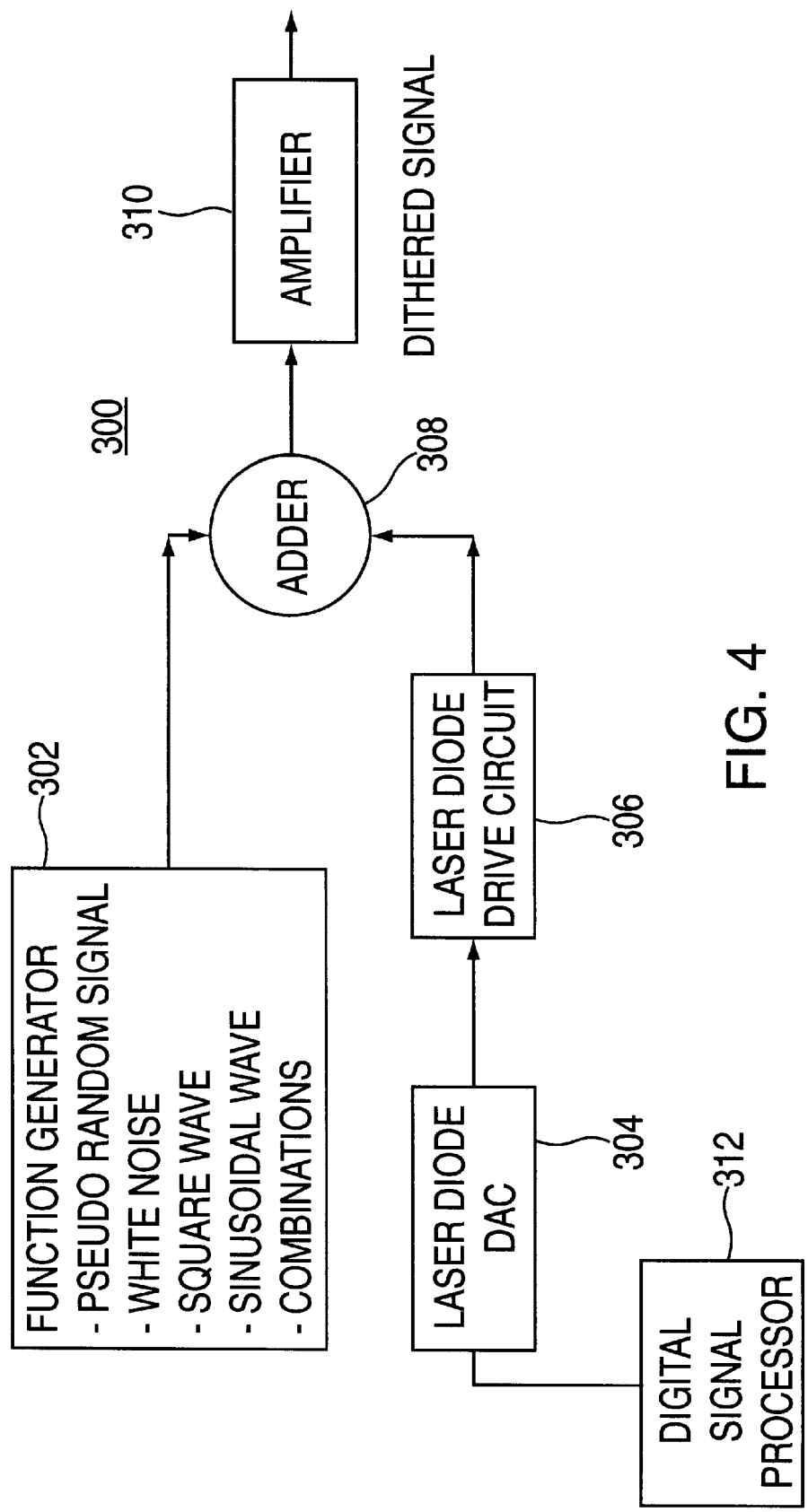
FIG. 4 is a block diagram of an analog system for generating a dithering signal for a fiber optic gyroscope illustrative of another specific embodiment of the present invention.

FIG. 4 illustrates a block diagram of an analog system for generating a dithering signal according to the present invention for a fiber optic gyroscope. The analog system is designated generally by reference numeral 300 and includes a function generator 302, a laser diode digital-to-analog converter (DAC) 304, a laser diode drive circuit 306, an adder 308, and an amplifier 310. A digital signal processor (DSP) 312 is also included to generate a dc level signal as required by the laser diode. The dc level signal controls the emitted power from the laser diode.

The function generator 302 can generate several different waveforms, such as square, sinusoidal and triangular. It is contemplated that the function generator 302 can also generate a signal having a waveform which is a combination of the above-mentioned waveforms. The function generator 302 can also generate signals having noise, such as pseudo random noise and/or white noise.

During operation of the analog system 300, the function generator 302 is turned on and a particular waveform or signal type, e.g., a signal having pseudo random and/or white noise, is selected using control knobs, buttons and/or switches. Accordingly, the function generator 302 generates an analog function signal having the selected waveform or signal type. The analog function signal is transmitted to the adder 308.

During operation, the DAC 304 is also turned on for converting the dc level signal received from the DSP 312 to an analog signal. The analog signal is transmitted to the laser diode drive circuit 306 causing the laser diode drive circuit 306 to generate a current drive signal. The function of the laser diode drive circuit 306 is to convert the input voltage level to the current level as required by the laser diode. Also, impedance matching and amplification circuitry can be included in the laser diode drive circuit 306. The current drive signal is transmitted to the adder 308.

Hence, the adder 308 adds the analog function signal, i.e., the signal generated by the function generator 302, and the current drive signal, i.e., the signal generated by the laser diode drive circuit 306, to provide an analog dithering signal. The analog dithering signal is transmitted to the amplifier 310 which amplifies the analog drive signal including the variations caused by the dithering signal, before transmitting the dithered analog drive signal to the laser diode light source of the fiber optic gyro.

The amplitude, frequency and/or phase of the analog function signal can be adjusted during operation of the system 300 using control knobs, buttons and/or switches on the function generator 302 to adjust the amplitude, frequency and/or phase of the generated dithering signal to provide minimum coherence length of the laser diode light source. It is contemplated that the function generator 302 can be programmed with a set of instructions to automatically adjust the amplitude, frequency and/or phase of the analog function signal.

Figure 5:
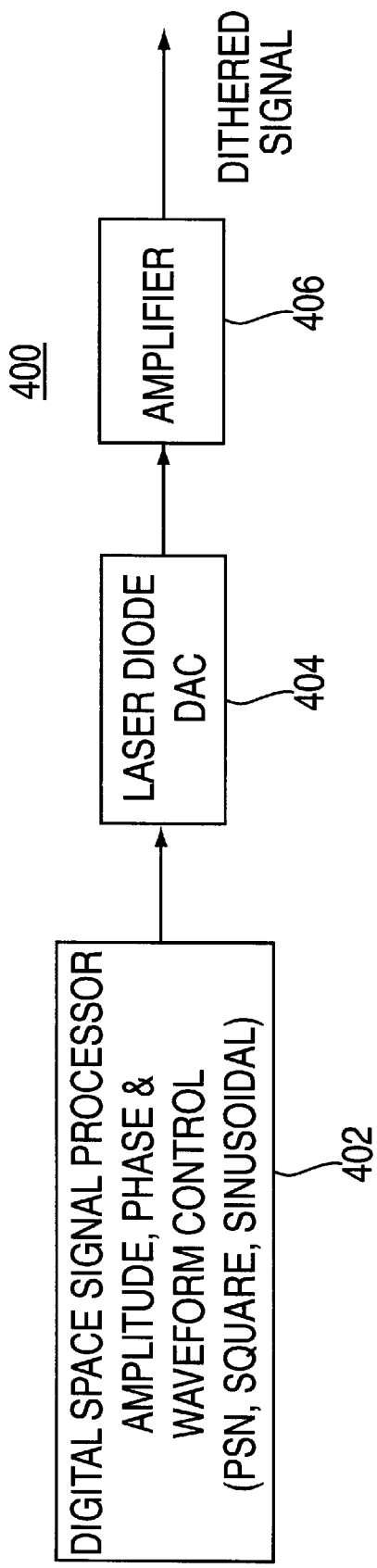
FIG. 5 is a block diagram of a digital system for generating a dithering signal for a fiber optic gyroscope illustrative of a further specific embodiment of the present invention.

With reference to FIG. 5, there is shown a block diagram of a digital system for generating the dithering signal for use according to a further illustrative embodiment of the present invention. The digital system is designated generally by reference numeral 400 and includes a digital signal processor (DSP) 402, a digital-to-analog converter (DAC) 404, and an amplifier 406.

During operation of the digital system 400, the DSP 402 is turned on and a particular waveform is selected either automatically or manually via a control panel. The waveform can be selected from a group which includes at least square, sinusoidal, triangular, and combinations thereof. Accordingly, the DSP 402 generates a digital function signal having the selected waveform.

The digital function signal is transmitted to the DAC 404 which converts the digital function signal to an analog dithering signal. The analog dithering signal is then amplified by the amplifier 406 before it is transmitted to the laser diode light source.

The DSP 402 of the digital system 400 can be programmed with a set of instructions to automatically control the characteristics of the generated digital function signal. That is, the amplitude, frequency and/or phase of the generated digital function signal can be automatically adjusted, which in turn causes the adjustment of the amplitude, frequency and/or phase of the dithering signal to provide minimum coherence length of the laser diode light source. It is contemplated that the DSP 402 can also be manually controlled via a control panel for adjusting the characteristics of the generated digital function signal.

Preferably, the analog system 300 of FIG. 4 and the digital system 400 of FIG. 5 provide a dithered drive signal having an amplitude of approximately four volts and a frequency of approximately 40 kHz.

Accordingly, our invention provides a system and method for improving spectrum linewidth and stability while using the lasing region of a conventional laser diode light source, and more specifically provides for an improved fiber optic gyroscope using a conventional laser diode as its light source. Our inventive system and method, as described above, provide a dithering signal for varying the drive current of the laser diode light source. Although the exact wave shape of the dithering signal does not affect the stability of the spectrum significantly, we have found that some commonly used available signal patterns, such as pseudo random noise, square wave, and sinusoidal wave, are both useful and practical for employment with the gyroscope. In accordance with our invention, by varying the drive current with a dither signal, the spectrum linewidth and stability of the conventional laser diode light source are significantly improved, so that the conventional laser diode can be employed as the light source for a fiber optic gyroscope.

While the present invention has been described in detail with reference to the specific embodiments, they are mere exemplary applications. Thus, it is to be clearly understood that many variations can be made by anyone skilled in the art within the scope and spirit of the present invention as defined by the claims.

What is claimed is:

1. A method for improving the in run bias stability and angle random walk of a fiber optic gyro driven by a laser diode, said method comprising the steps of applying a dithering signal to a laser drive circuit for the laser diode and applying the output of the laser diode to the fiber optic gyro without reflection of any output of the laser diode back to the laser diode.

2. A fiber optic gyro system having improved in run bias stability and angle random walk, said system comprising
 a fiber optic gryo having a fiber coil and an integrated optics chip including a polarizer,
 a laser diode,
 a laser diode drive circuit for the laser diode, and
 means for applying a dither signal to the laser diode drive circuit, the laser diode being directly connected to the fiber optic gyro through a coupler without any reflection of the output of the laser diode back to the laser diode.

* * * * *